United States Patent
Ben-Moshe et al.

(10) Patent No.: US 8,894,872 B2
(45) Date of Patent: Nov. 25, 2014

(54) ETCHING COMPOSITIONS, METHODS AND PRINTING COMPONENTS

(75) Inventors: Matti Ben-Moshe, Reut (IL); Michael Kheyfets, Jerusalem (IL)

(73) Assignee: DIP Tech Ltd., Kfar Saba (IL)

(*) Notice: Subject to any disclaimer, the term of this patent is extended or adjusted under 35 U.S.C. 154(b) by 649 days.

(21) Appl. No.: 12/679,501

(22) PCT Filed: Sep. 22, 2008

(86) PCT No.: PCT/IL2008/001266
§ 371 (c)(1),
(2), (4) Date: Jun. 28, 2010

(87) PCT Pub. No.: WO2009/040794
PCT Pub. Date: Apr. 2, 2009

(65) Prior Publication Data
US 2010/0282712 A1    Nov. 11, 2010

Related U.S. Application Data

(60) Provisional application No. 60/960,262, filed on Sep. 24, 2007.

(51) Int. Cl.
| | | |
|---|---|---|
| C23F 1/02 | (2006.01) | |
| C09K 13/00 | (2006.01) | |
| B65D 85/84 | (2006.01) | |
| C09D 11/30 | (2014.01) | |
| C09D 11/03 | (2014.01) | |
| C03C 15/00 | (2006.01) | |

(52) U.S. Cl.
CPC ............... C03C 15/00 (2013.01); C09D 11/30 (2013.01); C09D 11/03 (2013.01)
USPC ........................ 216/97; 252/79.1; 206/524.5

(58) Field of Classification Search
CPC ......... C03C 15/00; C09D 11/30; C09D 11/03
USPC ........................ 216/97; 252/79.1; 206/524.5
See application file for complete search history.

(56) References Cited

U.S. PATENT DOCUMENTS 4,490,181 A * 12/1984 McCready ................. 134/2
4,781,792 A * 11/1988 Hogan ....................... 216/36
(Continued)

FOREIGN PATENT DOCUMENTS

EP    0 128 682    12/1984
EP    0721430 B1    8/1999
(Continued)

OTHER PUBLICATIONS

Translation of JP 2000192036 A (2000) 7 pages.*
(Continued)

*Primary Examiner* — Duy Deo
*Assistant Examiner* — Mahmoud Dahimene
(74) *Attorney, Agent, or Firm* — Pearl Cohen Zedek Latzer Baratz LLP

(57) ABSTRACT

A liquid etching composition comprising: (a) at least one etching agent precursor having an activation temperature of at least 400° C., at which temperature said precursor yields an active agent suitable for chemical etching of glass, said precursor present at a concentration of at least 2.5% w/w; (b) a binder; and (c) a liquid vehicle.

21 Claims, 4 Drawing Sheets

(56) References Cited

U.S. PATENT DOCUMENTS

| | | | |
|---|---|---|---|
| RE33,100 E * | 10/1989 | Ibsen et al. ............... 106/35 |
| 5,594,044 A | 1/1997 | Yang |
| 6,140,391 A | 10/2000 | Zou et al. |
| 6,156,384 A | 12/2000 | Hutter et al. |
| 6,402,823 B1 | 6/2002 | Garcia Sainz et al. |
| 6,616,981 B1 | 9/2003 | Hutter et al. |
| 6,696,100 B2 | 2/2004 | Secrest et al. |
| 6,982,864 B1 | 1/2006 | Sridharan et al. |
| 7,029,110 B2 | 4/2006 | Takao et al. |
| 7,037,868 B2 | 5/2006 | Herrero et al. |
| 7,339,780 B2 | 3/2008 | Sridharan et al. |
| 2003/0068471 A1 | 4/2003 | Anderson et al. |
| 2003/0160026 A1 * | 8/2003 | Klein et al. ............... 216/83 |
| 2006/0191625 A1 | 8/2006 | Kapp et al. |
| 2007/0164117 A1 | 7/2007 | Swiler et al. |
| 2008/0081117 A1 * | 4/2008 | Sakasai ............... 427/384 |
| 2008/0121621 A1 | 5/2008 | Stockum et al. |
| 2010/0068889 A1 | 3/2010 | Stockum et al. |
| 2010/0071837 A1 | 3/2010 | Kapp et al. |

FOREIGN PATENT DOCUMENTS

| | | | |
|---|---|---|---|
| EP | 1272574 B1 | 3/2005 | |
| EP | 1347839 B1 | 10/2008 | |
| JP | 2000192036 A * | 7/2000 | ............ C09K 13/02 |
| RU | 179602 | 2/1993 | |
| RU | 1797602 A3 * | 12/1994 | ............ C03C 15/00 |
| WO | WO 0151573 A1 | 7/2001 | |
| WO | WO 0245870 A1 | 6/2002 | |
| WO | WO 2004018376 A1 | 3/2004 | |
| WO | WO 2005052071 A1 | 6/2005 | |
| WO | WO 2005073140 A1 | 8/2005 | |
| WO | WO 2006001872 A1 | 1/2006 | |
| WO | WO 2006009873 A1 | 1/2006 | |
| WO | WO 2006/074791 | 7/2006 | |
| WO | WO 2006077273 A1 | 7/2006 | |
| WO | WO 2007021400 A3 | 2/2007 | |
| WO | WO 2008/052636 | 5/2008 | |

OTHER PUBLICATIONS

Gutherie at al. (Decomposition of Alkali Chlorides at High Temperature, 1931, pp. 228-233).*

International Search Report for International App. No. PCT/IL08/01266. Date of mailing Feb. 26, 2009.

International Preliminary Report on Patentability for International App. No. PCT/IL08/01266. Date of completion Jan. 13, 2010.

* cited by examiner

ETCHING COMPOSITIONS, METHODS AND PRINTING COMPONENTS

CROSS REFERENCE TO RELATED APPLICATIONS

This application is a national stage application under 35 U.S.C. §371 of PCT/IL2008/001266 filed on 22 Sep. 2008 and subsequently published as WO/2009/040794 on 2 Apr. 2009, said PCT application claiming the benefit of U.S. provisional application 60/960,262 filed on 24 Sep. 2007 according to 35 U.S.C. §119 (e).

FIELD OF THE INVENTION

This invention relates to chemical etching on a hard substrate, such as glass.

BACKGROUND OF THE INVENTION

Glass is a hard, brittle and often transparent solid used, for example, in construction of windows, bottles, and lenses. Common types of glass include, but are not limited to soda-lime glass, borosilicate glass, boron and/or phosphorous doped glass, silicon dioxide, silicon nitride and aluminum oxynitride. Many types of glass contain silica as their main component. In many cases this oxide acts as a glass former which contributes to condensation to form a glass network.

Etching of glass has traditionally been performed by physical or chemical etching processes.

In previously available chemical etching processes, the surface to be etched is first covered with a mask of acid-resistant material forming a negative image, and then an uncovered portion of the surface defining the nascent positive image is exposed to an acid and 'eaten away', creating a desired etched pattern. Hydrofluoric acid (HF) is often used in chemical etching and provides a pattern with good abrasion resistance and durability.

In the physical etching process fine particles of sand are blasted against an unprotected portion of the surface to be decorated according to a mask. The sandblasting erodes the unmasked portion of the glass to produce a frosted appearance that provides a contrast for the untouched smooth transparent part of the glass. This process is lengthy and costly.

In some cases, screen printing is used to imitate an etched-appearance on glass. In screen printing, the etched appearance can be achieved by using etch imitation inks. In ink paste formulations for screen printing a combination of glass fits is used, in which a high melting frit is included. After firing a frosted appearance is produced by the high melting fits remaining on the surface. Screen printing is like chemical etching and physical etching in its reliance upon masks in the form of pre-prepared screens. The screens must be maintained and stored. Previously available screen printing inks are characterized by a narrow working temperature range that limits the utilization of etch imitation pattern in conjunction with other printing inks.

The three processes listed above all rely upon a mask that is removed after the action formation of the pattern. In many cases, the mask is formed by covering the entire substrate (e.g. with wax) and selectively removing solidified wax at places to be etched. In other cases, the mask is applied in a single step.

U.S. Pat. No. 5,594,044 describes an jet ink composition and a method for printing on glass, plastic, and metal surfaces messages having good adhesion and isopropyl alcohol rub resistance. The composition includes an organic solvent, a flexible thermoplastic urethane resin, a colorant, a cellulose nitrate resin, and an adhesion promoter.

U.S. Pat. No. 6,140,391 describes an jet ink composition suitable for application onto a substrate comprising an ink carrier, a colorant, a polyol, an aldehyde-based cross-linking agent, and a catalyst that promotes a reaction between the cross-linking agent, the polyol, and the substrate. In use, the composition is projected as a stream of ink droplets to a substrate with control of the direction of the droplets so that the droplets form the desired printed image on the substrate, and heating the image to obtain a cured printed image. Examples of preferred cross-linking agents are modified melamine formaldehyde resin and modified urea formaldehyde resin. The substrates preferably possess carboxyl, hydroxyl, amide, or sulfhydryl groups. An example of a preferred substrate is cellulose. The cross-linking reaction is carried out at relatively moderate temperatures and at high speeds. The printed image has excellent adhesion to substrates, abrasion resistance, crinkling resistance, water resistance, and heat resistance.

U.S. Pat. No. 6,156,384 and U.S. Pat. No. 6,616,981 describe a cationic, water-soluble polymer used as a substrate treatment resin (i.e., coating) to improve color-fastness and adhesion of an ink-jet ink printed onto the coated substrate. In one described formulation, a 50% solids aqueous solution of a cationic acrylic resin is provided as a substrate pre-treatment resin.

U.S. Pat. No. 7,029,110 describes a dispersion composition including a colorant and an acrylic polymer having a furan structure as well as an ink for an ink jet printer including the dispersion composition. The dispersion composition can achieve the satisfactory stability of the colorant irrespective of the kind of the colorant, and allows the inks to be formulated to have the same composition.

WO/2006/074791 describes a printable etching medium, with non-Newtonian flow properties for the etching of surfaces in the production of solar cells and the use thereof. The publication particularly relates to corresponding particle-containing compositions, by means of which the very selective fine structures can be etched without damaging or attacking adjacent surfaces.

WO/2008/052636 describes etching media containing particles in the form of etching pastes suitable for the full-surface, or selective etching of finest lines or structures in silicon surfaces and layers, and glass-like surfaces being formed of suitable silicon compounds. The publication also describes the use of the pastes for etching such surfaces.

SUMMARY OF THE INVENTION

An aspect of some exemplary embodiments relates to an etching compositions including at least one chemical etching agent precursor. The precursor is inactive with respect to etching. In some exemplary embodiments of the invention, the precursor is present at a concentration of 2.5%, 3%, 4% 5%, 6%, 7%, 8%, 9%, 10%, 20%, 30% w/w or intermediate or greater percentages. Optionally, increasing a percentage of etching agent precursor contributes to an increase in depth and/or width of an etched pattern and/or optical density.

In some exemplary embodiments of the invention, the precursor is subject to activation above a specific temperature. In some exemplary embodiments of the invention, the specific temperature is an inherent property of the precursor. Optionally, an additive can be provided to lower the specific temperature in practice, although it remains theoretically constant. The specific temperature can be, for example, 400° C., 450° C., 500° C., 550° C., 600° C., 630° C., 650° C., 700° C."

In some exemplary embodiments of the invention, the precursor yields an active agent suitable for etching glass at the specific temperature. Optionally, the specific temperature can vary as a function of the specific precursor and/or pressure conditions and/or additive concentration and/or intended substrate. Optionally, the transition from precursor to active agent is characterized by reaction kinetics which favor active agent formation. In some exemplary embodiments of the invention, the precursor includes an alkali metal salt and/or an alkaline earth metal salt.

An aspect of some exemplary embodiments of the invention relates to applying a liquid etching composition as described hereinabove and/or hereinbelow onto an unmasked solid substrate surface to form a pattern and firing the surface at the specific temperature at which the precursor yields the active agent which etches the pattern on the glass surface. In some exemplary embodiments of the invention, the applying occurs as part of a printing process. Optionally, the printing process is an ink jet printing process. In some exemplary embodiments of the invention, the substrate is glass.

In some exemplary embodiments of the invention, the etching compositions are provided in an ink jet cartridge. Optionally, a printer fitted with such a cartridge is suitable for practice of methods according to various exemplary embodiments of the invention.

In some exemplary embodiments of the invention, there is provided a liquid etching composition which includes: (a) at least one etching agent precursor having an activation temperature of at least 400° C., at which temperature the precursor yields an active agent suitable for chemical etching of glass, the precursor present at a concentration of at least 2.5% w/w; (b) a binder; and (c) a liquid vehicle.

Optionally, the precursor includes at least one alkali metal salt.

Optionally, each of the at least one alkali metal salt is independently selected from the group consisting of a carbonate salt, a sulfate salt and a nitrate salt.

Optionally, the precursor includes at least one member selected from the group consisting of potassium carbonate, lithium carbonate, sodium sulfate and lithium nitrate.

Optionally, the activation releases a chemical moiety selected from the group consisting of carbon dioxide, nitrogen dioxide, a chloride, a sulfide, a bromide, an aluminate, a silicate, a phosphate and a fluoride.

Optionally, the activation releases a chemical moiety selected from the group consisting of carbon dioxide and nitrogen dioxide.

Optionally, the active etching agent includes an oxide of an alkali metal.

Optionally, the composition includes a dispersing agent in a quantity sufficient to prevent phase separation for at least 7 days under storage conditions.

Optionally, the dispersing agent includes dendritic polymers.

Optionally, a concentration of the at least one etching agent precursor does not exceed 50% w/w, optionally 25% w/w, optionally 20% w/w, optionally 12% w/w.

Optionally, a concentration of the at least one etching agent precursor exceeds 5% w/w, optionally 7.5% w/w, optionally 9%, optionally 11%.

Optionally, the binder includes at least one member of the group consisting of an organic polymeric binder and an inorganic binder.

Optionally, the organic polymeric binder includes polyvinylpyrolidone.

Optionally, the inorganic binder includes silica nanoparticles.

Optionally, the composition includes at least one pigment.

Optionally, the composition includes an additive which decreases the temperature at which the etching agent precursor yields the active agent.

In some exemplary embodiments of the invention, a composition as described hereinabove is used in ink-jet printing.

Optionally, the ink-jet printing is selected from the group consisting of drop on demand ink-jet printing method and continuous ink-jet printing.

In some exemplary embodiments of the invention, a composition as described hereinabove is used in a process selected from the group consisting of screen printing, spray or dip coating, gravure and flexographic printing.

In some exemplary embodiments of the invention, there is provided an etching method which includes: (a) applying a liquid etching composition according to any of claims 1-20 onto a glass surface; and (b) firing the surface at a temperature above 400° C. to form etched patterns thereon.

In some exemplary embodiments of the invention, there is provided an etching method including: (a) applying a liquid etching composition includes at least one etching agent precursor, at a concentration of 2.5% w/w, onto a glass surface to form a pattern; and (b) firing the surface at a temperature above 400° C. so that the precursor undergoes activation to yield an active agent which chemically etches the pattern on the glass surface.

Optionally, the applying is by a process selected from the group consisting of ink-jet printing, film printing, spray or dip coating, gravure and flexographic printing. In some exemplary embodiments of the invention, there is provided a printing process which includes: (a) incorporating into a printing apparatus a liquid etching composition substantially as described hereinabove; (b) printing a pattern on a glass surface using the liquid etching composition; and (c) firing the glass surface at a temperature above 400° C. to etch the pattern on the glass surface.

In some exemplary embodiments of the invention, there is provided a printing process which includes: (a) incorporating into a printing apparatus a liquid etching composition includes at least one etching agent precursor, at a concentration of 2.5% w/w; (b) printing a pattern on a glass surface using the liquid etching composition; and (c) firing the surface at a temperature above 400° C. so that the precursor undergoes activation to yield an active agent which etches the pattern on the glass surface.

Optionally, the glass surface is an unmasked glass surface.

In some exemplary embodiments of the invention, there is provided an ink jet printing cartridge containing a liquid etching composition substantially as described hereinabove.

In some exemplary embodiments of the invention, there is provided an article of manufacture which includes: a liquid etching composition substantially as described hereinabove; packaging material; and instructions for use, the instructions specifying a temperature at which the chemical etching agent precursor is converted to the active agent suitable for etching glass.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear.

Dimensions of components and features shown in the figures are chosen primarily for convenience and clarity of presentation and are not necessarily to scale. The attached figures are.

DETAILED DESCRIPTION OF EMBODIMENTS

Overview

Embodiments of the invention relate to liquid etching compositions, etching methods, printing processes, ink jet printing cartridges and articles of manufacture.

Specifically, some embodiments of the invention are based on the finding that it is possible to obtain etch patterns on a solid substrate surface (e.g. glass) using an etching composition which includes at least one chemical etching agent precursor which is inactive with respect to etching. According to some exemplary embodiments of the invention, an exemplary composition according to the invention is ink jet printed onto a glass surface and produces an etched pattern thereupon when fired at a suitable temperature.

Alternatively or additionally, some embodiments of the invention can be used in printing processes (e.g. ink jet printing) and/or to print a pattern for etching onto an unmasked surface.

The principles and operation of a liquid etching compositions, etching methods, printing processes, ink jet printing cartridges and articles of manufacture according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Figure 1:
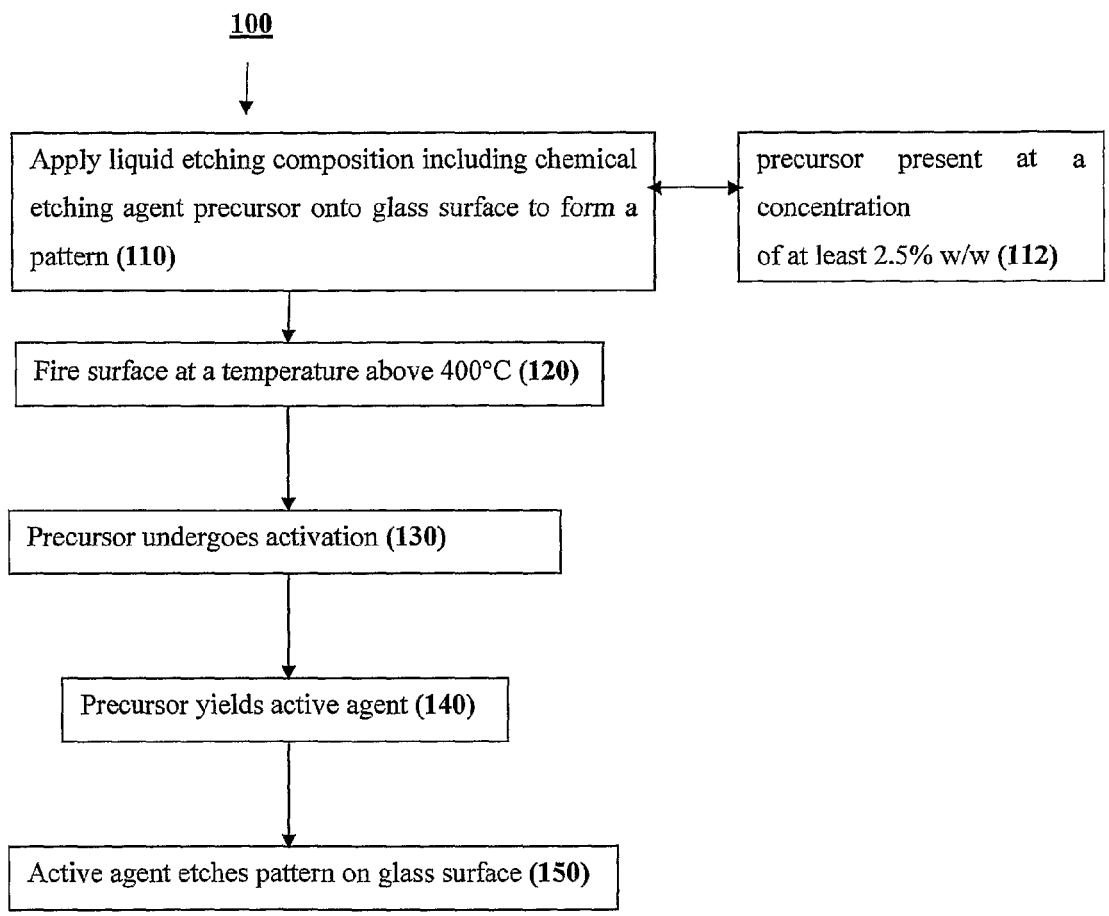
FIG. 1 is a simplified flow diagram of an exemplary etching method according to some embodiments of the invention.

FIG. 1 is a simplified flow diagram of an exemplary etching method 100 according to some embodiments of the invention. In depicted exemplary method 100 a liquid etching composition including a chemical etching agent precursor is applied 110 onto a glass surface to form a pattern. According to some exemplary embodiments of the invention, the precursor is present 112 at a concentration of at least 2.5% w/w.

Subsequent firing 120 at a temperature above 400° C. causes the precursor to undergo 130 activation to yield 140 an active agent which etches 150 the pattern applied at 110 on the glass surface.

As will be described in greater detail hereinbelow, there is a relationship between the specific precursor employed and the selected firing temperature.

Figure 2:
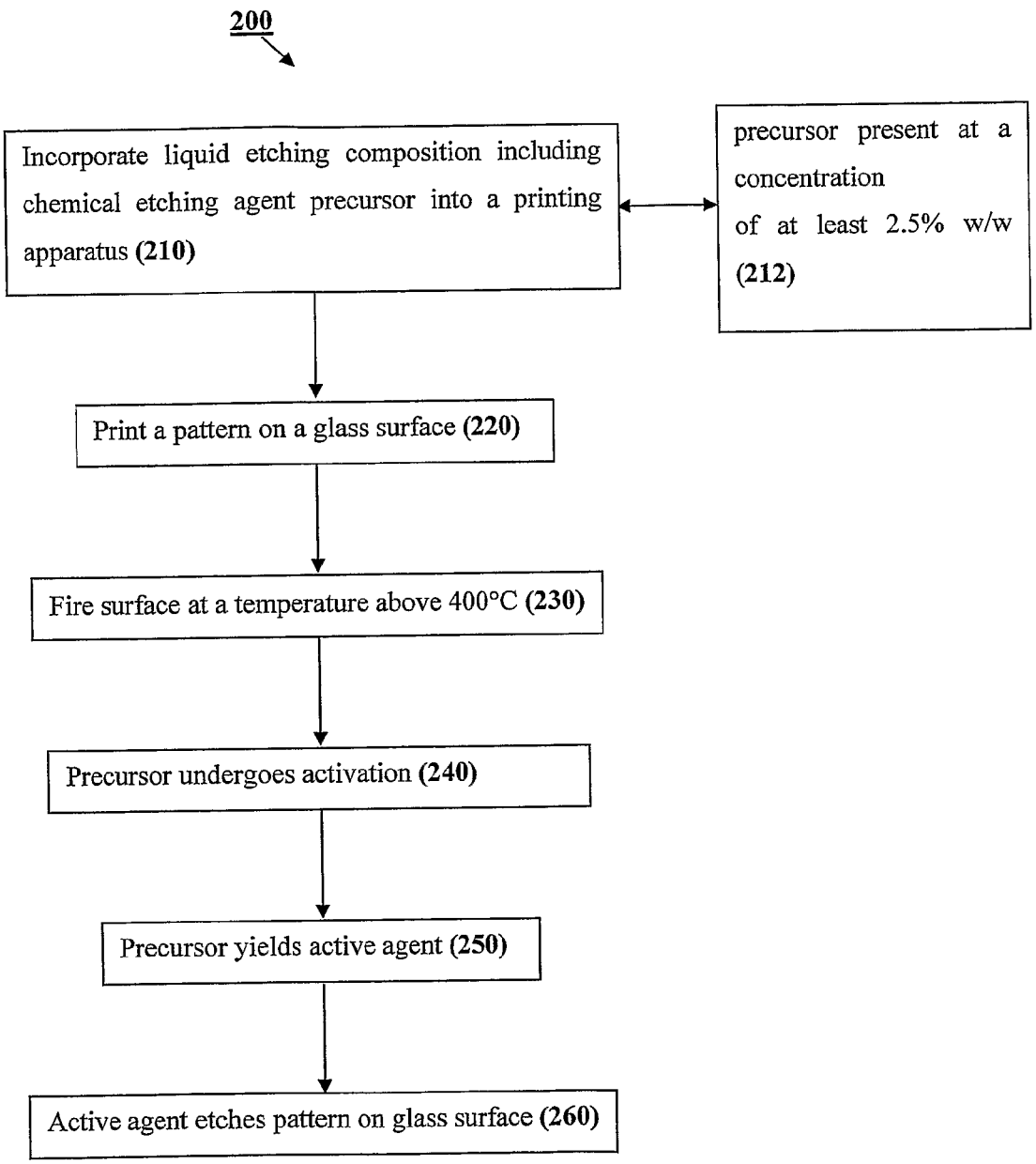
FIG. 2 is a simplified flow diagram of an exemplary printing process according to some embodiments of the invention.

FIG. 2 is a simplified flow diagram of an exemplary printing process 200 according to some embodiments of the invention. Depicted exemplary process 200 is one way of performing depicted exemplary method 100 of FIG. 1. Process 200 includes incorporating 210 a liquid etching composition including chemical etching agent precursor into a printing apparatus. Optionally, the precursor is present 212 at a concentration of at least 2.5% w/w. At 220 the apparatus prints a pattern on a glass surface. Subsequent firing 230 firing of the surface at a temperature above 400° C. causes the precursor to undergo 240 activation to yield 250 an active agent which etches 260 the pattern printed at 220 on the glass surface.

Exemplary Compositions Including Etching Agent Precursors

Exemplary liquid etching compositions suitable for use in embodiments of the invention include at least one chemical etching agent precursor at a concentration of at least 2.5% w/w. The precursor is subject to activation at an appropriate temperature to yield an active agent suitable for etching glass. The compositions include a binder and a liquid vehicle. The appropriate temperature is, to a large degree, inherent in the precursor, although additives may be employed to influence reaction parameters in some cases.

The precursor is selected so that subsequent firing at the appropriate temperature causes the precursor to undergo activation to yield an active agent which etches the pattern on the surface. In some exemplary embodiments of the invention, temperatures above 360, 370, 380, 390, 400, 450, 500, 550, 600, 630, 650 or 700° C. or intermediate or greater temperatures are employed. According to some exemplary embodiments of the invention, a temperature of at least 400° C. is employed for firing.

In some exemplary embodiments of the invention the chemical etching agent precursor includes an alkali metal salt. Alkali metal salts suitable for use in the context of various embodiments of the invention include, but are not limited to potassium carbonate, lithium carbonate, sodium carbonate, sodium sulfate, lithium nitrate, sodium nitrate and potassium nitrate. Alternatively or additionally, the chemical etching agent precursor can include an alkaline earth metal salt such as, for example, calcium nitrate.

One of ordinary skill in the art will easily be able to implement additional etching agent precursors based upon the instant description and examples. Similarly, each etching agent precursor will naturally suggest an appropriate temperature based upon known behavior of the specific precursor. Thus, the invention is not limited to specific salts recited herein, but includes many additional etching agent precursors which will suggest themselves to one of ordinary skill in the art and be implemented, using the principles disclosed herein, without undue experimentation.

Optionally, a viscosity of the etching composition can be varied by adjusting the nature and/or amount of the binder and/or the liquid vehicle. According to some exemplary embodiments of the invention, adjustments in viscosity contribute to pattern formation by affecting spreading or diffusion of an applied pattern prior to filing. Thus, according to some exemplary embodiments of the invention, a greater viscosity contributes to a higher pattern resolution and a lesser viscosity contributes to a reduced pattern resolution (e.g. blurring).

In some exemplary embodiments of the invention binder concentration based on the total weight of the etching composition is in the range of 0.1-30 w/w %. Optionally, binder concentration is in the range of 1-10% w/w.

According to some exemplary embodiment of the invention the liquid vehicle is an aqueous-based vehicle. Optionally, water concentration based on the total weight of the composition is in the range of 2-95% w/w, optionally in the range of 25-75% w/w.

Optionally, exemplary compositions according to the invention can include wetting agents and/or defoamers and/or humectants and/or rheology control agents and/or fixation agents.

Exemplary Etching Agent Precursor Concentrations

In various exemplary embodiments of the invention, the amount of precursor is adjusted to influence one or more etching characteristics. Etching characteristics include, but are not limited to, depth and/or width of an etched pattern. Optionally, increasing a percentage of etching agent precursor contributes to an increase in depth and/or width and/or optical density of an etched pattern. Optionally, viscosity and etching agent precursor concentration of a specific composition each contribute to etching characteristics.

In some exemplary embodiments of the invention a concentration of the at least one chemical etching agent precursor does not exceed 50% optionally, 25% optionally, 20% optionally, 12% w/w or lesser or intermediate percentages.

In some exemplary embodiments of the invention a concentration of the at least one chemical etching agent precursor exceeds 5% w/w optionally, 7.5% w/w, 9% w/w, 10% w/w or intermediate or greater percentages.

Exemplary Binders

According to some exemplary embodiments of the invention, a binder is included in the composition to contribute to substrate adhesion. Optionally, the binder binds or cements the etching agent and/or etching agent precursor. Optionally, this reduces crystallization. Alternatively or additionally, the binder binds pigment particles. According to some exemplary embodiments of the invention, binding of pigment particles contributes to a reduction in printing defects.

According to various exemplary embodiments of the invention, the binder can include an organic polymeric binder and/or an inorganic binder. Organic polymeric binders suitable for use in exemplary embodiments of the invention include, but are not limited to polyvinylpyrolidone (PVP), polyvinylalcohol (PVA), polyethylene oxide (PEO), polyvinyl butyral (PVB), polyethylene glycols (PEG), starch, carboxymethyl cellulose (CMC), methyl cellulose, gelatin, pullulan, hydroxyethyl cellulose (HEC) and hydroxypropyl cellulose (HPC). Inorganic binders suitable for use in exemplary embodiments of the invention include, but are not limited to silica nanoparticles, titania nanoparticles, zinc compound nanoparticles, and zirconia nanoparticles.

In some exemplary embodiments of the invention the inorganic binder includes inorganic pigments with particle size of less than 1 micron in diameter and/or pigmented frit particles with particle size of less than 2 micron in diameter. Optionally, pigment particles add a tint to the etched pattern. Alternatively or additionally, pigmented fit particles contribute to coloration or tint.

Exemplary Additives

In some exemplary embodiments the composition of the invention further comprises an additive which decreases the temperature at which the etching agent precursor yields the active agent. Optionally, the change in temperature is due to a flux effect. Optionally, the additive includes one or more of an alkali metal silicate, alkaline earth metal silicate, an alkali metal borate, a metal oxide and a non-metal oxide. Alkali metal silicates suitable for use as additives in exemplary embodiments of the invention include, but are not limited to sodium silicate, potassium silicate and lithium silicate either alone or in combination. An alkaline earth metal silicate suitable for use as an additive in exemplary embodiments of the invention is magnesium silicate. Alkali metal borates suitable for use as additives in exemplary embodiments of the invention include, but are not limited to sodium borate, potassium borate, and mixtures thereof. Metal oxides suitable for use as additives in exemplary embodiments of the invention include, but are not limited to, lead oxide, strontium oxide, barium oxide, calcium oxide, bismuth oxide, beryllium oxide, SnO and $SnO_2$. Non-metal oxides suitable for use as additives include, but are not limited to boron oxide.

According to some exemplary embodiments of the invention, additives contribute to a change in flux properties.

Exemplary Chemical Activation Mechanism

In exemplary embodiments of the invention described hereinabove and set forth in Examples hereinbelow, when heating to the specific activation temperature transforms the inactive precursor into a corresponding active agent suitable for chemical etching of glass, there is a concurrent release of a byproduct chemical moiety. For example, potassium carbonate when heated to 630° C. can release carbon dioxide as a byproduct molecule and form potassium oxide which is a strong oxidizer that etches the glass surface. In the same manner Lithium nitrate can release nitrogen dioxide as a byproduct molecule at 630° C. temperature and form Lithium oxide which is a strong oxidizer that etches the glass surface. In some exemplary embodiments of the invention activation of the precursor includes a chemical change (e.g. degradation) which releases a byproduct molecule selected from the group consisting of carbon dioxide and nitrogen dioxide. In some exemplary embodiments of the invention the active chemical etching agent comprises an oxide of an alkali metal.

In other exemplary embodiments of the invention, the activation releases a chemical moiety such as, for example a chloride, a sulfide, a bromide, an aluminate, a silicate, a phosphate or a fluoride.

Exemplary Dispersing Agents

In some exemplary embodiments of the invention the composition comprises a dispersing agent in a quantity sufficient to prevent phase separation. According to various exemplary embodiments of the invention, the quantity can be adjusted to prevent phase separation for 7, 14, 21, 30, 60, 90, 120, 150, 180 or 360 days or intermediate or greater numbers of days. According to some exemplary embodiments of the invention, increased concentration of dispersing agent contributes to a longer shelf life. According to other exemplary embodiments of the invention, a shorter shelf life is accepted in order to avoid imparting undesirable characteristics to the composition by increasing dispersing agent composition.

One of ordinary skill in the art will be able to implement an appropriate dispersing agent concentration to impart a desired shelf life to a composition according to an exemplary embodiment of the invention without undue experimentation.

Optionally, the dispersing agent includes dendritic polymers. Dendritic polymers suitable for use as dispersing agents in the context of various embodiments of the invention include, but are not limited to dendrimers or hyperbranched dendritic polymers such as hydroxyl functional dendritic polymers, e.g., Boltorn® Dendritic Polymers (Perstorp, Sweden) and hyperbranched polyesteramides such as Hybrane® (DSM, Holland) or mixtures thereof.

Exemplary Use of Pigments

In some exemplary embodiments of the invention, the composition includes one or more pigments. Combination of pigments with etching agent precursors in a single composition contributes to an ability to tint etched patterns. Tinting with a desire color can be achieved by selecting an appropriately colored pigment. Since the color must be stable at the relevant firing temperature, pigments based upon metal salts are suitable for use in many exemplary embodiments of the invention. For example, cobalt salts can impart a blue tint, iron oxide can impart a red tint, copper salts can impart blue or green tints, and gold or silver salts can be used to impart gold or silver color respectively.

Exemplary Use Scenarios

Optionally, a composition according to one or more embodiments of the invention described above can be used in ink-jet printing. The term "ink jet printing" as used in this specification and the accompanying claims includes drop on demand ink-jet printing and continuous ink-jet printing.

Alternatively or additionally, a composition according to one or more embodiments of the invention described above can be used in screen printing and/or spray coating and/or dip coating and/or gravure and/or flexographic printing.

Optionally, a particular printing method being contemplated can contribute to formulation considerations. For example, viscosity of an exemplary composition can be adjusted according to the contemplated printing method.

For example, for application in drop on demand ink-jet printing, an exemplary etching composition containing an etching agent precursor might be formulated with a viscosity in the range of 10-30 cP, optionally 15-25 cP, at jetting temperature. Low viscosity contributes to an ability to form small droplets when exiting the jet, but may reduce pattern resolution by causing spreading of applied composition on the substrate.

A composition with the same etching agent precursor formulated for continuous ink-jet printing might have a viscosity in the range of 1-10 cP, optionally 3-6 cP, at jetting temperature.

Low viscosity contributes to an ability to form small droplets when exiting the printer jet, but may reduce pattern resolution by causing spreading of applied composition on the substrate.

A composition with the same etching agent precursor formulated for screen printing might have a viscosity in the range of 5,000-50,000 cP, optionally 10,000-30,000 cP, at room temperature.

High viscosity would reduce an ability to form small droplets but does not interfere with screen printing. Compositions formulated for screen printing are less subject to spreading of applied composition on the substrate.

Exemplary Article of Manufacture

Figure 3:
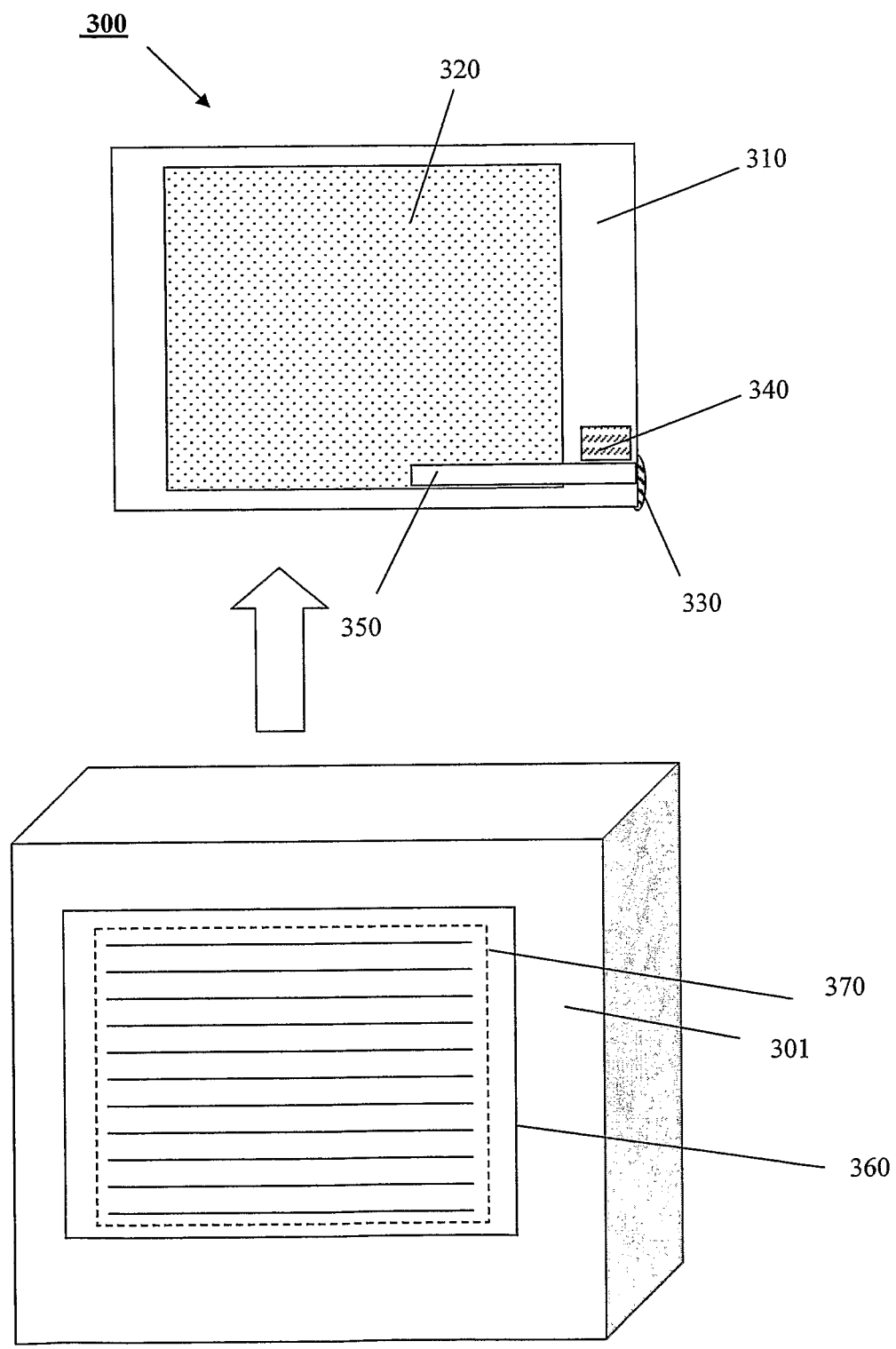
FIG. 3: is a representative view of an exemplary ink-jet printing cartridge according to some embodiments of the invention.

FIG. 3 is a schematic representation depicting an inkjet print cartridge 310 according to one exemplary embodiment of the invention. Depicted exemplary cartridge 310 is designed and configure for mounting in the carriage of a conventional inkjet printer as known in the art. Optionally, design and/or configuration of cartridge 310 are adjusted to conform to specifications of commercially available printers.

Depicted exemplary cartridge 310 includes an ink reservoir 320 and a print head 330 connected by an ink conduit 350. Although reservoir 320 is depicted as an "integral" reservoir it can be replaced by a "snap-on" reservoir or a receiver for ink from an off-axis ink reservoir to produce additional exemplary embodiments of the invention.

In use, a control interface 340 regulates application ink by print head 330 and/or a flow of ink in conduit 350. Optionally, interface 340 is subject to control by an external device (e.g. a desktop or laptop computer; not pictured) and/or a user interface provided as part of the printer in which cartridge 310 is installed.

Depicted exemplary article of manufacture 300 includes in reservoir 320 a liquid etching composition as described hereinabove, packaging material 301 and instructions for use 370 which specify a temperature at which the chemical etching agent precursor provided in the composition in reservoir 320 is converted to the active agent suitable for etching glass.

In the depicted exemplary embodiment, packaging material 301 is depicted as a carton, although it could be provided as any packaging form known in the art.

In the depicted exemplary embodiment, instructions for use 370 are depicted as appearing on a label 360 on packaging material 301.

According to other exemplary embodiments of the invention, instructions for use 370 are provided on a package insert within packaging material 301 (e.g. as a card or pamphlet). According to still other exemplary embodiments of the invention, instructions for use 370 are provided on a label on cartridge 310.

Figure 4:
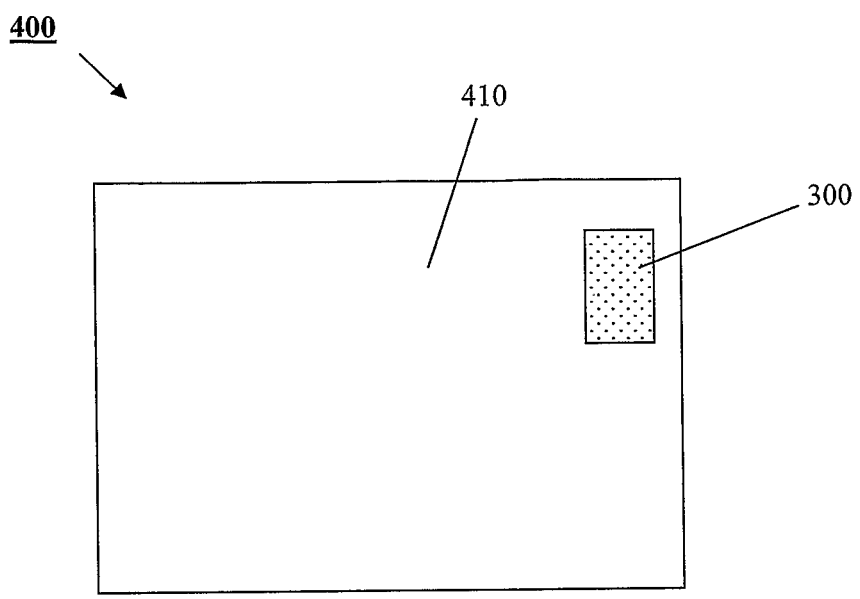
FIG. 4: is an illustration of an exemplary ink-jet printing cartridge mounted in a printing apparatus according to some embodiments of the invention.

FIG. 4 is a schematic representation 400 of a printing apparatus 410 fitted with inkjet print cartridge 310 of FIG. 3. By varying the type and/or configuration of apparatus 410 and/or cartridge 310, it is possible to generate a large number of methods 100 and/or printing processes 200 as described hereinabove.

Exemplary Advantages

According to some exemplary embodiments of the invention, use of compositions and/or methods described hereinabove provides an alternative to physical sand-blasting, conventional chemical etching or etch imitation coatings. Optionally, such alternatives are attractive because of environment and/or regulatory considerations and/or cost considerations and/or considerations of structural integrity of the substrate to be etched.

According to some exemplary embodiments of the invention, use of etching agent precursors which have no significant etching activity when applied contributes to an ability to digitally print patterns on an unmasked surface and subsequently etch the printed pattern solid surfaces such as glass without the need for a, asking layer (e.g. wax).

Optionally, compositions and methods and processes described hereinabove provide previously unavailable flexibility. According to some exemplary embodiments of the invention, this flexibility contributes to an ability to print different images in sequence more simply than previously available screen-printing and/or wet chemical processes.

According to some exemplary embodiments of the invention, digital printing of etch patterns on solid substrates such as glass as described hereinabove is advantageous because digital storage of desired patterns reduces costs of physical storage and/or maintenance (e.g. of screens or transfer devices).

Alternatively or additionally, digital printing of etch patterns on solid substrates such as glass reduces costs for low value printing. These costs can be prohibitive in silk-screen printing.

Alternatively or additionally, digital printing of etch patterns on solid substrates such as glass increases the ease and versatility of switching from one design to another.

Alternatively or additionally, digital printing of etch patterns on solid substrates such as glass increases the capacity for edge to edge printing utilization.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

The terms "include" and "have" and their conjugates as used herein mean "including but not necessarily limited to".

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above description, illustrate the invention in a non limiting fashion.

MATERIALS AND METHODS

The following materials are used in exemplary formulations described in examples hereinbelow:

PVP 40K refers to poly vinyl pyrollidone available from Sigma Aldrich (Saint Louis, Mo., USA);

Dowanol DB refers to diethylene glycol n-butyl ether available from Dow Chemical Company, la Porte Tex., USA;

BYK-346 available from BYK-Chemie, Germany;

DISPERBYK 180 available from BYK-Chemie, Germany;

Boltorn H40 refers to a dendritic polymer available from Perstorp specialty chemicals AB, Perstorp, Sweden;

Hybrane 10 and Hybrane 11 refer to dendritic polymers available from Koninklijke DSM N.V., Heerlen, Netherlands;

Surfynol 465 available from Air Products and Chemicals Inc., Allentown Pa., USA;

Snowtex 40 and Snowtex 50 refer to silica nanoparticles available from Nissan Chemical America Corporation, Houston, Tex. USA; and Solsperse 41,000 refers to dispersant available from Lubrizol Corporation Wickliffe, Ohio, USA.

Specified percentages (%) of ingredients are w/w (weight per weight) unless otherwise indicated.

Example 1

Exemplary $LiNO_3$ Etching Composition

In order to demonstrate the feasibility of using an alkali metal salt etching agent precursor to etch an unmasked glass substrate, the following composition was prepared:

4.1 wt % of Boltorn H40 were dissolved in 77.4 wt % of 4:1 water:Dowanol DB mixture. 9.2 wt % of Lithium nitrate ($LiNO_3$), 4.5 wt % of Glycerol, 2.7 wt % of Isobutanol, 1.6 wt % of PVP 40K and 0.5 wt % of BYK-346 were added to the mixture. The ink was ink-jet printed on glass and fired at 650° C. Upon firing, the glass surface was etched according to the printed pattern. The optical density of the etched glass was 0.22 as measured by IC Film optical densitometer (Gretag Macbeth, USA).

This result indicates that the Lithium nitrate precursor was decomposed to form lithium oxide at 650° C. causing the glass substrate to be etched.

Example 2

Additional Exemplary $LiNO_3$ Etching Composition

In order to demonstrate the effect of etchant concentration, the following composition was prepared:

Lithium nitrate ($LiNO_3$, 12%) was dissolved in 10% solution of poly vinyl pyrollidone (PVP, 40K) in water: Dowanol DB (4:1). 5% of dendritic polymer (Hybrane 11, DSM, Holland) were added to the mixture and a wetting agent (0.2%) (BYK-346). The ink was ink-jet printed on glass and fired at 630° C. Upon firing, the glass surface was etched according to the printed pattern. The optical density of the etched glass, measured as in Example 1, was 0.42.

This result indicates that increasing the concentration of Lithium nitrate precursor produced a higher concentration of lithium oxide at 630° C. causing stronger etching of the glass substrate. This example, together with example 1 illustrates that lithium oxide serves as an efficient etchant to glass at elevated temperatures, and that the etchant concentration determines the etching strength.

Example 3

Exemplary $K_2Co_3$ Etching Composition

In order to demonstrate that the feasibility of using an alkali metal salt etching agent precursor to etch an unmasked glass substrate is not limited to $LiNO_3$, the following composition was prepared:

Potassium Carbonate ($K_2CO_3$, 10%) was dissolved in 5% solution of poly vinyl pyrollidone (PVP, 40K) in water:Dowanol DB (4:1). 5% dendritic polymer (Hybrane 10, DSM, Holland) were added to the mixture and a wetting agent (0.2%) (BYK-346). The resultant ink was ink-jet printed on glass and fired at 630° C. Upon firing, the glass surface was etched according to the printed pattern. The surface was washed in water after printing. The optical density of the etched glass, measured as in Example 1, was 0.28.

These results establish that alkali metal salts other than Li salts are suitable for use in the context of compositions according to exemplary embodiments of the invention. Similarly, these results indicate that alkali metal salts other than nitrates are suitable for use in the context of compositions according to exemplary embodiments of the invention. Alternatively or additionally, this example illustrates the feasibility of ink-jet printing on an unmasked substrate as a means of etching glass.

Examples 1 through 3 taken collectively suggest that alkali metal oxides in general are suitable for etching glass when fired at appropriate temperatures.

Example 4

Exemplary Mixed Etching Agent Precursor Composition

In order to demonstrate the feasibility of using a mixture of alkali metal salt etching agent precursors to etch an unmasked glass substrate, the following composition was prepared:

Lithium carbonate and Sodium sulfate (3:1, 10%) were dissolved in 5% solution of poly vinyl pyrrolidone (PVP, 40K) in water:Dowanol DB (4:1). 5% dendritic polymer (Hybrane 10, DSM, Holland) were added to the mixture and a wetting agent (0.2%) (BYK-346). The mixture was ink-jet printed on glass and fired at 650° C. Upon firing, the glass surface was etched according to the printed pattern. The optical density of the etched glass, measured as described above, was 0.3.

These results establish that both lithium carbonate and sodium sulfate are suitable for use in the context of compositions according to exemplary embodiments of the invention. Similarly, these results indicate that a mixture of alkali metal salts is suitable for use in the context of compositions according to exemplary embodiments of the invention.

This example illustrates glass etching using a flux composition that enables the control of light scattering and transmission through the glass.

Example 5

Exemplary Pigmented Etching Agent Precursor Composition

In order to demonstrate the feasibility of using a mixture of alkali metal salt etching agent precursors together with a coloring agent in order to form an enamel and tint the glass, the following composition was prepared:

Lithium nitrate ($LiNO_3$, 10%) was dissolved in water:Dowanol DB (4:1). 5% of dendritic polymer (Hybrane 10) were added to the mixture and a wetting agent (0.2%) (Surfynol 465, Airproducts Inc., US). 5% of silica nanoparticles (Snowtex 40) were added together with 5% cobalt silicate pigment (BASF, Germany) dispersed in water with 1% BYK 180.

This ink formulation was ink-jet printed on glass and fired at 630° C. Upon firing, the glass surface was covered with a blue tinted (L=42.2, a=−5.5, b=−42.0) etch patterns according to the printed pattern.

The resultant blue tint indicates that the etching agent (lithium nitrate) and the pigment (cobalt silicate) do not interfere with one another. This example illustrates that it is feasible to achieve a tinted etch pattern by ink-jet printing on an unmasked substrate.

Alternatively or additionally, this example illustrates that addition of silica nanoparticles to the composition causes the nanoparticles to bind to the substrate surface when the surface and nanoparticles are concurrently etched during firing.

Example 6

Additional Exemplary Pigmented Etching Agent Precursor Composition

In order to demonstrate the feasibility of using a mixture of alkali metal salt etching agent precursors together with a coloring agent in order to form enamel and tint the glass, the following composition was prepared:

Lithium nitrate ($LiNO_3$, 10%) and boric acid (0.2%) were dissolved in water: Dowanol DB: glycerol. 5% of dendritic polymer (Hybrane 10) were added to the mixture and a wetting agent (0.2%) (Surfynol 465). 5% of silica nanoparticles (Snowtex) were added together with 5% transparent iron oxide pigment (Bio-Pigments, Israel) dispersed in water with 5% solsperse 41,000 dispersant (Lubrizol, USA). This ink formulation was ink-jet printed on glass and fired at 630° C. Upon firing, the glass surface was covered with a red tinted (L=65.3, a=19.8, b=39.2) etch patterns according to the printed pattern.

As in example 5, this example illustrates that addition of silica nanoparticles to the composition causes the nanoparticles to bind to the substrate surface when the surface and nanoparticles are concurrently etched during firing.

The resultant red tint indicates that the etching agent (lithium nitrate) and the pigment (iron oxide) do not interfere with one another. In this example, boric acid served as an inorganic binder of the enamel.

Examples 5 and 6 illustrate that it is possible to form an enamel on the surface of the glass substrate without employing a glass frit.

Table 1 summarizes exemplary formulations presented in examples 1-6.

TABLE 1 exemplary liquid etching compositions

| Compound w/w % | Ex. 1 | Ex. 2 | Ex. 3 | Ex. 4 | Ex. 5 | Ex. 6 |
|---|---|---|---|---|---|---|
| Dowanol DB | 15.5 | 14.6 | 16.0 | 16.0 | 14.8 | 24.8 |
| Water | 61.9 | 58.2 | 63.8 | 63.8 | 59.0 | 24.8 |
| Glycerol | 4.5 | — | — | — | — | 24.8 |
| Isobutanol | 2.7 | — | — | — | — | — |
| PVP 40K | 1.6 | 10.0 | 5.0 | 5.0 | — | — |
| Hybrane 10 | — | — | 5.0 | 5.0 | 5.0 | 5.0 |
| Hybrane 11 | — | 5.0 | — | — | — | — |
| Boltorn H40 | 4.1 | — | — | — | — | — |
| $LiNO_3$ | 9.2 | 12.0 | — | — | 10.0 | 10.2 |
| $Li_2CO_3$ | — | — | — | 7.5 | — | — |
| $K_2CO_3$ | — | — | 10.0 | — | — | — |
| $H_3BO_3$ | — | — | — | — | — | 0.2 |
| $Na_2SO_4$ | — | — | — | 2.5 | — | — |
| BYK 346 | 0.5 | 0.2 | 0.2 | 0.2 | — | — |
| Surfynol 465 | — | — | — | — | 0.2 | 0.2 |
| BYK 180 | — | — | — | — | 1.0 | — |
| Solsperse 41,000 | — | — | — | — | — | 0.25 |
| Silica (Snowtex-40) | — | — | — | — | 5.0 | — |
| Silica (Snowtex-50) | — | — | — | — | — | 5.0 |
| Cobalt Silicate | — | — | — | — | 5.0 | — |
| Iron oxide | — | — | — | — | — | 4.75 |

It is expected that during the life of this patent many printing methods will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the invention. Additionally, components and/or actions ascribed to exemplary embodiments of the invention and depicted as a single unit may be divided into subunits. Conversely, components and/or actions ascribed to exemplary embodiments of the invention and depicted as subunits/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are purely illustrative in nature and are not intended to limit the scope of the invention which is defined solely by the following claims. Specifically, the invention has been described in the context of ink jet printing but might also be used in other printing methods or even in manual application of etch patterns (e.g. by painting or drawing with an etch composition according to an exemplary embodiment of the invention).

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

This application claims priority from U.S. provisional patent application 60/960,962 which is fully incorporated herein by reference. In jurisdictions where incorporation by reference is not permitted, Applicant reserves the right to reinstate any phrasing which may have been accidentally deleted from the priority document during reformatting of the international application

The invention claimed is:

1. A liquid etching composition for inkjet printing comprising:
    (a) at least one non-active etching agent precursor, which is inactive with respect to chemically etching glass, the precursor comprising at least one alkali metal salt having an activation temperature of at least 400° C., wherein when heating the composition to the activation temperature, said precursor yields an active etching agent suitable for chemical etching of glass, said precursor present at a concentration of at least 2.5% w/w;
    (b) a binder comprising silica nanoparticles; and
    (c) a liquid vehicle,
    wherein the liquid etching composition is for inkjet printing.

2. A composition according to claim 1, wherein each of said at least one alkali metal salt is independently selected from the group consisting of a carbonate salt, a sulfate salt and a nitrate salt.

3. A composition according to claim 1, wherein said precursor includes at least one member selected from the group consisting of potassium carbonate, lithium carbonate sodium sulfate and lithium nitrate.

4. A composition according to claim 1, comprising a dispersing agent including dendritic polymers.

5. A composition according to claim 1, wherein said binder comprises polyvinylpyrolidone.

6. A composition according to claim 1, further comprising at least one pigment.

7. A liquid etching composition for inkjet printing comprising:
    (a) at least 2.5% w/w of a non-active etching agent precursor, which is inactive with respect to chemically etching glass, the precursor having an activation temperature of at least 400° C., wherein when heating the composition to the activation temperature, the non-active precursor yields an active etching agent suitable for chemical etching of glass;
    (b) a binder;
    (c) a liquid vehicle; and
    (d) an additive which decreases the temperature at which the non-active etching agent precursor yields the active etching agent,
    wherein the liquid etching composition is for inkjet printing.

8. A composition according to claim 7, comprising a dispersing agent including dendritic polymers.

9. A composition according to claim 7, wherein said binder comprises polyvinylpyrolidone.

10. A composition according to claim 7, wherein the binder comprises silica nanoparticles.

11. A composition according to claim 7, further comprising at least one pigment.

12. A liquid etching composition according to claim 7, wherein said additive includes at least one member of the group consisting of alkali metal silicates, alkaline earth metal silicates, alkali metal borates, metal oxides and non-metal oxides.

13. A liquid etching composition according to claim 12, wherein said alkali metal silicate includes at least one member of the group consisting of sodium silicate, potassium silicate and lithium silicate.

14. A liquid etching composition according to claim 12, wherein said alkaline earth metal silicate includes magnesium silicate.

15. A liquid etching composition according to claim 12, wherein said alkali metal borate includes at least one member of the group consisting of sodium borate and potassium borate.

16. A liquid etching composition according to claim 12, wherein said metal oxide includes at least one member of the group consisting of lead oxide, strontium oxide, barium oxide, calcium oxide, bismuth oxide, beryllium oxide, SnO and of $SnO_2$.

17. A liquid etching composition according to claim 12, wherein said non-metal oxide includes boron oxide.

18. An etching method comprising:
    (a) inkjet printing a liquid etching composition comprising at least one agent precursor, at a concentration of at least 2.5% w/w, onto a glass surface to form a pattern, wherein the precursor is inactive with respect of chemically etching glass; and
    (b) firing said surface at a temperature above the 400° C. so that the precursor undergoes activation to yield an active agent which chemically etches the pattern on the glass surface.

19. A method according to claim 18, wherein said glass surface is an unmasked glass surface.

20. An ink jet printing cartridge containing a liquid etching composition according to claim 1.

21. An article of manufacturing comprising:
    a liquid etching composition according to claim 1;
    packaging material; and
    instructions for use, said instructions specifying a temperature at which said non-active etching agent precursor is converted to said active agent suitable for etching glass.

* * * * *